(No Model.)
R. S. PENCE & C. H. SCOTT.
OSCILLATING SEAT FOR REAPERS, MOWERS, &c.
No. 545,529. Patented Sept. 3, 1895.
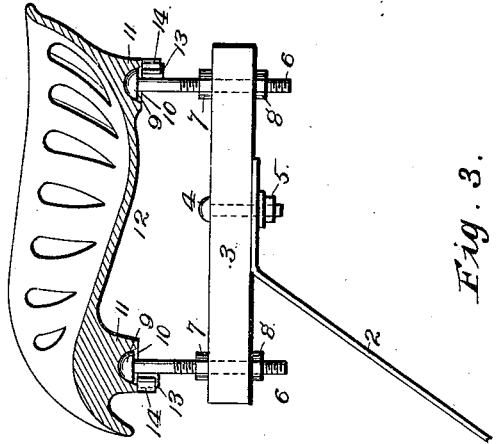
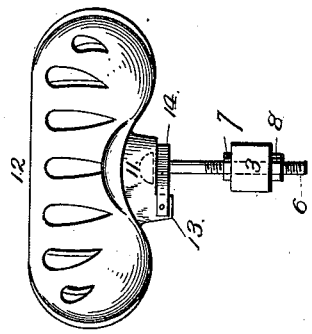
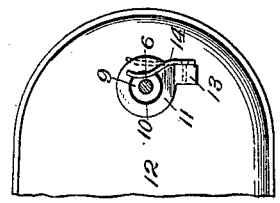
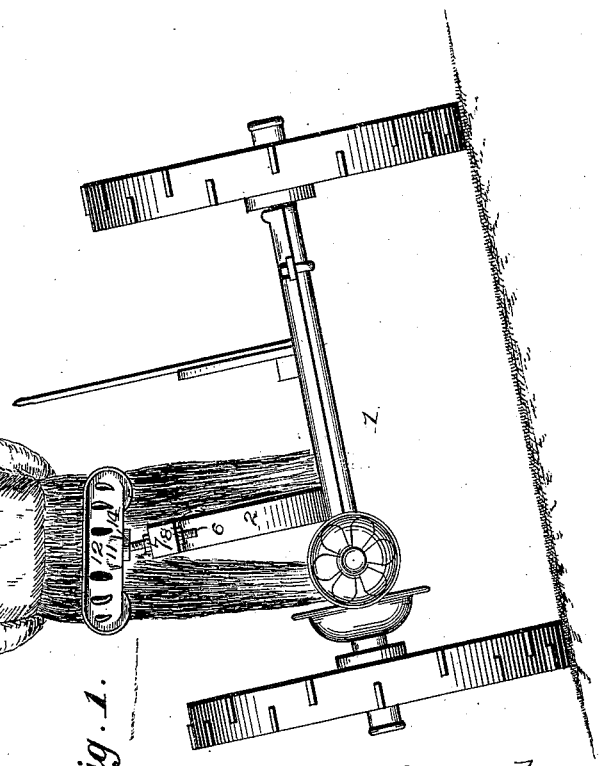
Witnesses:
F. G. Fischer
Inventors
R. S. Pence and C. H. Scott,
By Higdon & Higdon
Attys.

UNITED STATES PATENT OFFICE.

ROBERT S. PENCE AND CHARLES H. SCOTT, OF KEARNEY, MISSOURI.

OSCILLATING SEAT FOR REAPERS, MOWERS, &c.

SPECIFICATION forming part of Letters Patent No. 545,529, dated September 3, 1895.

Application filed March 14, 1895. Serial No. 541,823. (No model.)

*To all whom it may concern:*

Be it known that we, ROBERT S. PENCE and CHARLES H. SCOTT, of Kearney, Clay county, Missouri, have invented certain new and useful Improvements in Oscillating Seats for Reapers, Mowers, and other Vehicles, of which the following is a full, clear, and exact description, reference being had to the accompanying drawings, forming a part thereof.

Our invention relates to oscillating seats for reapers, mowers, and other vehicles, and has for its object to provide a seat which will automatically adjust itself so as to maintain a horizontal position when the vehicle is passing over ground which has its surface in a level or inclined plane or is otherwise irregular.

A further object of the invention is to provide a seat which will swing or rotate so as to permit the driver to face in any direction required, and, finally, to provide a seat of the character above described which is simple, strong, durable, and inexpensive of construction.

With these objects in view the invention consists in certain novel and peculiar features of construction and combinations of parts, as will be hereinafter described and claimed.

In order that the invention may be fully understood, we will proceed to describe it with reference to the accompanying drawings, in which—

Figure 1 represents a rear elevation of a portion of a mowing-machine provided with a seat embodying our invention, and shows the same maintaining its horizontal position as the said vehicle travels along the side of a hill or inclined plane. Fig. 2 is a vertical central longitudinal section of the seat to illustrate clearly the construction of the same and its component mechanism. Fig. 3 is a front view of the same. Fig. 4 is an inverted plan view of a portion of the seat.

In the said drawings, 1 designates the supporting framework of a mowing-machine of the usual or any preferred construction.

2 designates the seat-supporting spring, and 3 a bar, preferably in the shape of a piece of two-by-four scantling. This bar is pivoted about its middle so as to swing laterally in a horizontal plane upon the vertical bolt 4, which extends through the horizontal portion of the seat-supporting spring 2, and is engaged by a washer and a retaining-nut 5 to secure it in position. The bar 3 projects a suitable distance beyond the opposite ends of said horizontal portion of the seat-supporting spring, and extending vertically through the same near each end is a bolt 6. These bolts are secured at any desired point in their vertical adjustment by nuts 7 and 8, which bear, respectively, against the upper and lower sides of the said bar 3. The bolts 6 at their upper ends are provided with the usual hemispherical heads 9, which engage corresponding but deeper cavities 10 in the lower sides of the bosses 11, cast integral with, preferably, and depending from the seat 12, which may be of any desired form or configuration. Depending from each of said bosses 11 is a lug 13, to which is secured a transversely-extending retaining-spring 14, which intersects or chords the cavity 10 and lies below but not in contact with the under side of the head 9 of the bolt, owing to the fact that the cavity is deeper than said head. This arrangement, it is manifest, will permit the seat to oscillate or rock laterally upon said heads for some distance before the intersecting ends of the said springs will limit said oscillating or rocking movement by coming in contact with the under side of the heads of said bolts. It will therefore be clearly seen and understood that as the machine tilts to one side or the other in passing over inclined planes or other irregular surfaces of ground the seat maintains its horizontal position and the driver is not subjected to the strain and the violent wrenches and jolts incident to seats of the ordinary construction, leaving him free to pay more attention to the work in hand, as it is not necessary for him to exercise care to prevent being dislodged from his seat. It will also be apparent that by mounting the seat pivotally, as described, the driver may quickly and easily face in any direction required and always maintain his equilibrium upon the seat, owing to its oscillating nature.

If required to raise or lower the front or back portion of the seat it can easily be accomplished by properly operating the adjusting-nuts 7 and 8, and when it is desired to remove the seat from said bolts or to place it in operative position thereon it is accomplished simply by springing the ends of the springs 14 to the position shown in dotted lines, Fig. 4, and lifting the seat directly from said heads or lowering it upon the same, as will be readily understood.

From the above description it will be apparent that we have produced an oscillating seat which will be found very convenient upon mowers, reapers, and other farm vehicles.

Having thus described our invention, what we claim as new, and desire to secure by Letters Patent, is—

1. An oscillating seat for reapers, mowers, and other vehicles, comprising a bar carried by the seat-supporting spring of the vehicle, bolts extending vertically and adjustably through said bar, and a seat provided with cavities in which the heads of said bolts rest, substantially as set forth.

2. An oscillating seat for reapers, mowers, and other vehicles, comprising a bar carried by the seat-supporting spring of the vehicle, bolts extending vertically through said bar, a seat provided with cavities in which the heads of said bolts rest, and retaining-springs carried by said seat and extending transversely of said cavities and the under side of the heads of said bolts, substantially as set forth.

3. An oscillating seat for reapers, mowers, and other vehicles, comprising a seat-supporting spring, a bar pivotally mounted upon the same, bolts extending vertically through said bar, provided with hemispherical heads at their upper ends, nuts engaging said bolts at the upper and lower sides of said bar, a seat provided with hemispherical cavities in which rest the said hemispherical heads of said bolts, and springs carried by lugs depending from the seat and extending transversely of said cavities and the under sides of the heads of said bolts, substantially as and for the purpose set forth.

In testimony whereof we affix our signatures in the presence of two witnesses.

ROBERT S. PENCE.
CHARLES H. SCOTT.

Witnesses:
R. M. MASSEY,
HARLAND FARMAN.